US008010780B2

(12) United States Patent
Sood et al.

(10) Patent No.: US 8,010,780 B2
(45) Date of Patent: *Aug. 30, 2011

(54) METHODS AND APPARATUS FOR PROVIDING INTEGRITY PROTECTION FOR MANAGEMENT AND CONTROL TRAFFIC OF WIRELESS COMMUNICATION NETWORKS

(75) Inventors: Kapil Sood, Beaverton, OR (US); Jesse R. Walker, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,953

(22) Filed: Aug. 27, 2009

(65) Prior Publication Data

US 2009/0327694 A1     Dec. 31, 2009

(51) Int. Cl.
*H04L 29/06* (2006.01)
(52) U.S. Cl. ....................................... 713/150
(58) Field of Classification Search .................... 713/150
See application file for complete search history.

(56) References Cited

U.S. PATENT DOCUMENTS 7,647,508 B2 * 1/2010 Sood et al. .................... 713/193

OTHER PUBLICATIONS

IEEE P802.11w/D11.0, Draft Standard for Information Technology—Telecommunications and information exchange between systems—Loca and metropolitan area networks—Specific Requirements, IEEE Standards Activities Department, Jun. 2009, 114 pgs, -Specifically citing sections 7 & 8 -pp. 9-38.

* cited by examiner

*Primary Examiner* — Kambiz Zand
*Assistant Examiner* — Stephen Sanders
(74) *Attorney, Agent, or Firm* — James S. Finn

(57) ABSTRACT

Embodiments of the present invention provide a method comprising transmitting, by a communication node, an information element (IE), the IE including a feature field indicating whether the communication node operates in accordance with an integrity protection protocol specifically for management frames, and the IE further including an enforcement field that advertises whether the integrity protection protocol for management and control frames is mandatory, and generating, by the communication node, a pairwise transient key (PTK), the PTK including a first plurality of keys and a pairwise integrity key (PIK), wherein the first plurality of keys are configured to protect an integrity of data frames transmitted by the communication node and the PIK is configured to protect an integrity of management frames transmitted by the communication node, wherein management frames are dedicated to management traffic and wherein the first plurality of keys and the PIK are different keys. Other embodiments may be described and claimed.

19 Claims, 5 Drawing Sheets

METHODS AND APPARATUS FOR PROVIDING INTEGRITY PROTECTION FOR MANAGEMENT AND CONTROL TRAFFIC OF WIRELESS COMMUNICATION NETWORKS

BACKGROUND

As wireless communication becomes more and more popular at offices, homes, schools, etc., protection of management and control traffic via wireless links are critical to ensure the security of wireless environments. Without such protection, wireless communication networks may be susceptible to security threats such as denial of service, forgery attacks, and/or transmission of unauthenticated messages to disconnect authenticated users from respective networks. For example, a rouge device may impersonate authentication credentials of a legitimate device (e.g., a media access control (MAC) address). Thus, authentication of management and control traffic via wireless links may provide data integrity and data confidentiality for wireless environments.

DETAILED DESCRIPTION

In general, methods and apparatus for providing integrity protection for management and control traffic of wireless communication networks are described herein. The methods and apparatus described herein are not limited in this regard.

Figure 1:
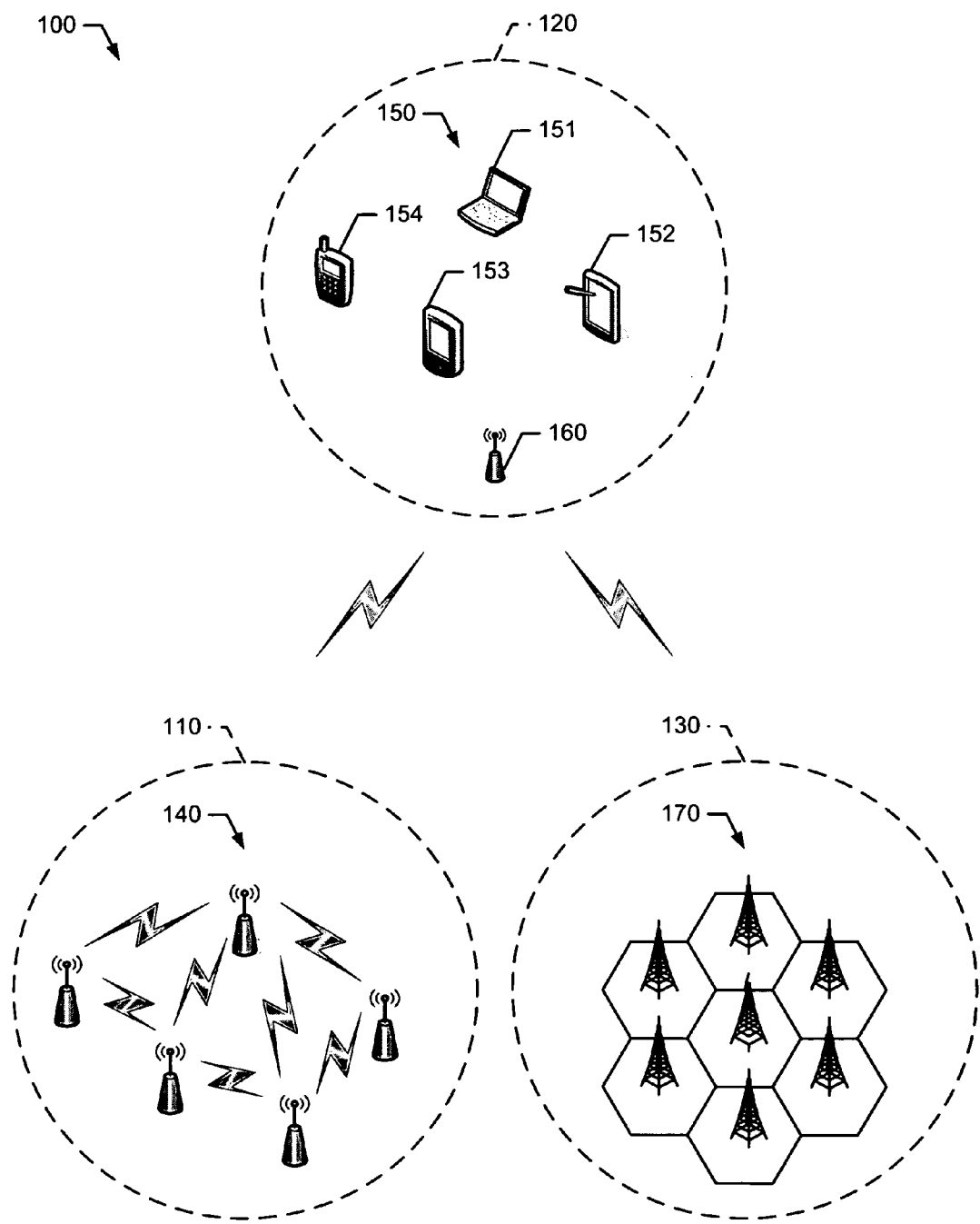
FIG. 1 is a schematic diagram representation of an example wireless communication system according to an embodiment of the methods and apparatus disclosed herein.

Referring to FIG. 1, an example wireless communication system 100 including one or more wireless communication networks, generally shown as 110, 120, and 130, is described herein. Although FIG. 1 depicts three wireless communication networks, the wireless communication system 100 may include additional or fewer wireless communication networks. Each of the wireless communication networks 110, 120, and 130 may include one or more communication nodes. In one example, the wireless communication network 110 may be a wireless mesh network. The wireless mesh network 110 may include two or more mesh points (MPs) 140. Although FIG. 1 depicts five MPs, the wireless mesh network 110 may include additional or fewer MPs. The MPs 140 may include access points, redistribution points, end points, and/or other suitable connection points for traffic flows via mesh paths.

The MPs 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. For example, the MPs 140 may implement OFDM modulation to transmit large amounts of digital data by splitting a radio frequency signal into multiple small sub-signals, which in turn, are transmitted simultaneously at different frequencies. In particular, the MPs 140 may use OFDM modulation as described in the 802.xx family of standards developed by the Institute of Electrical and Electronic Engineers (IEEE) and/or variations and evolutions of these standards (e.g., 802.11, 802.15, 802.16, etc.) to communicate via the wireless links with each other (e.g., forward data within the wireless mesh network 110). The MPs 140 may also operate in accordance with other suitable wireless communication protocols that require very low power such as Bluetooth, Ultra Wideband (UWB), and/or radio frequency identification (RFID) to communicate with each other.

The wireless communication system 100 may also include wireless non-mesh networks. In one example, the wireless communication network 120 may be a basic service set (BSS) network. The BSS network 120 may include one or more stations 150, generally shown as 151, 152, 153, and 154. Although FIG. 1 depicts four stations, the BSS 120 may include additional or fewer stations. For example, the BSS 120 may include a laptop computer, a desktop computer, a handheld computer, a tablet computer, a cellular telephone, a pager, an audio/video device (e.g., an MP3 player), a game device, a navigation device (e.g., a GPS device), a monitor, a printer, a server, and/or other suitable wireless electronic devices.

The stations 150 may communicate via wireless links as described in the 802.xx family of standards developed by the Institute of Electrical and Electronic Engineers (IEEE) and/or variations and evolutions of these standards (e.g., 802.11, 802.15, 802.16, etc.). In one example, the stations 150 may operate in accordance with the 802.16 family of standards developed by IEEE to provide for fixed, portable, and/or mobile broadband wireless access (BWA) networks (e.g., the IEEE std. 802.16, published 2004). The stations 150 may also use direct sequence spread spectrum (DSSS) modulation (e.g., the IEEE std. 802.11b) and/or frequency hopping spread spectrum (FHSS) modulation (e.g., the IEEE std. 802.11). Further, the stations 150 may also operate in accordance with other suitable wireless communication protocols that require very low power such as Bluetooth, Ultra Wideband (UWB), and/or radio frequency identification (RFID) to communicate via wireless links. Alternatively, the stations 150 may communicate via wired links (not shown). For example, the stations 150 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate. The methods and apparatus described herein are not limited in this regard.

The BSS network 120 may also include one or more communication nodes such as an access point (AP) 160 to provide wireless communication services to the stations 150. Although FIG. 1 depicts one AP, the BSS 120 may include additional APs. The AP 160 may receive and/or transmit data in connection with the stations 151, 152, 153, and/or 154. In addition to operating as an access point within the BSS network 120, the AP 160 may operate as a mesh AP. For example, the AP 160 may operate as an MP of the wireless mesh network 110 to communicate with the MPs 140. In particular, the AP 160 may receive and/or transmit data in connection with one or more of the plurality of MPs 140. As a result, the AP 160 may operate as a mesh AP to communicate with both the MPs 140 of wireless mesh network 110 and the stations 150 of the BSS network 120.

The wireless communication system 100 may also include a radio access network (RAN) 130 (e.g., a cellular network). The RAN 130 may include one or more base stations 170. Although FIG. 1 depicts seven base stations, the RAN 130 may include additional or fewer base stations. The base stations 170 may operate in accordance with one or more of several wireless communication protocols to communicate with wireless communication devices and/or nodes of the wireless mesh network 110, the BSS network 120, and/or other wireless communication networks. In one example, the base stations 170 of the RAN 130 may communicate with the stations 150 of the BSS network 120 directly (e.g., without using the AP 160). In particular, these wireless communication protocols may be based on analog, digital, and/or dual-mode communication system standards such as frequency division multiple access (FDMA)-based standards, the time division multiple access (TDMA)-based standards (e.g., Global System for Mobile Communications (GSM), General Packet Radio Services (GPRS), Enhanced Data GSM Environment (EDGE), Universal Mobile Telecommunications System (UMTS), etc.), code division multiple access (CDMA)-based standards, wideband CDMA (WCDMA)-based standards, variations and evolutions of these standards, and/or other suitable wireless communication standards. The methods and apparatus described herein are not limited in this regard.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless mesh network 110 may be implemented to provide WPANs, WLANs, WMANs, WWANs, and/or other suitable wireless communication networks. Although certain examples have been described above, the scope of coverage of this disclosure is not limited thereto.

Figure 2:
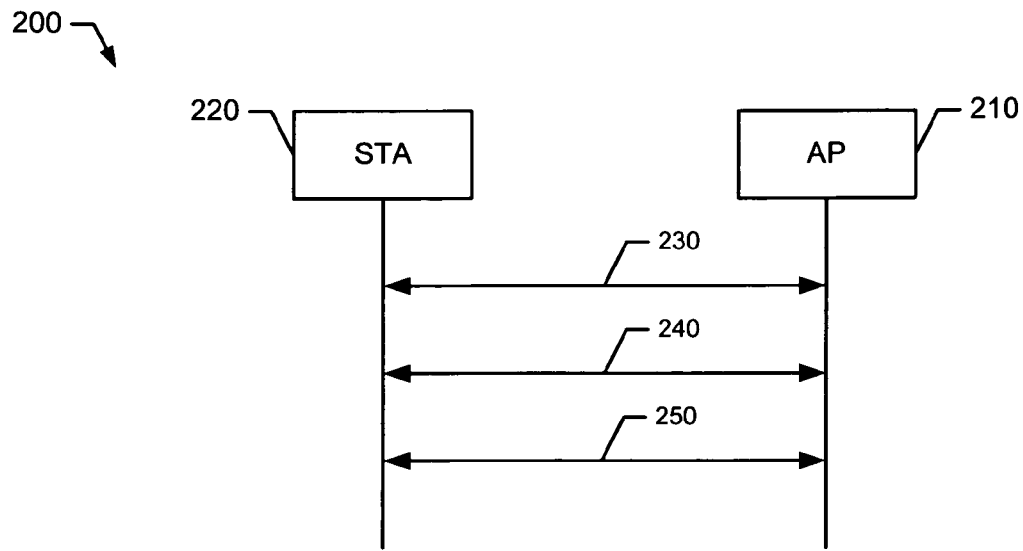
FIG. 2 is a block diagram representation of an example integrity protection system.

In the example of FIG. 2, an integrity protection system 200 may include two or more communication nodes, generally shown as a first communication node 210 and a second communication node 220. Each of the first communication node 210 and the second communication node 220 may be an access point, a mesh point, a station, or a network server. In general, the first and second communication nodes 210 and 220 may communicate with each other to discover security capabilities, negotiate security, authenticate communication, manage integrity protection keys, and/or protect management or control traffic between the first and second communication nodes 210 and 220.

Figure 3:
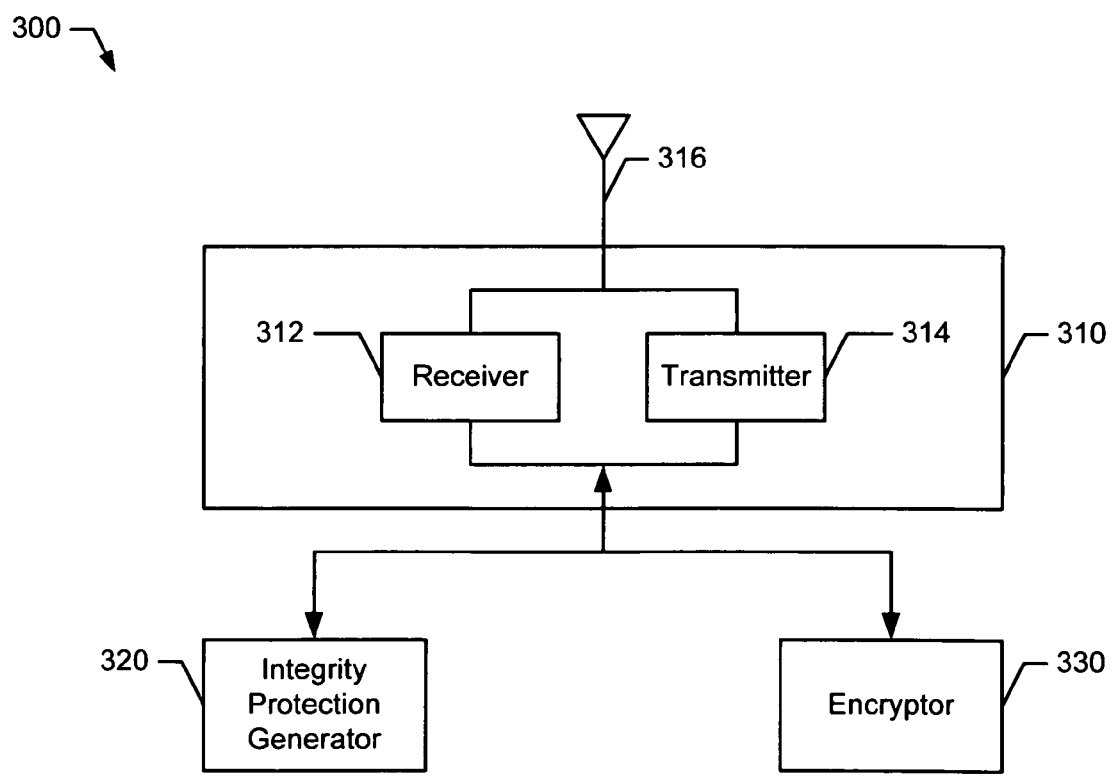
FIG. 3 is a block diagram representation of an example communication node of the example integrity protection system of FIG. 2.

Turning to FIG. 3, a communication node 300 may include a communication interface 310, an integrity protection generator 320, and an encryptor 330. The communication interface 310 may include a receiver 312, a transmitter 314, and an antenna 316.

The communication interface 310 may receive and/or transmit management and control traffic. The antenna 316 may be one or more directional or omni-directional antennas including, for example, dipole antennas, monopole antennas, patch antennas, loop antennas, microstrip antennas, or other types of antennas suitable for transmission of radio frequency (RF) signals. Although FIG. 3 depicts a single antenna, the communication node 300 may include additional antennas. For example, the communication node 300 may include a plurality of antennas to implement a multiple-input-multiple-output (MIMO) system.

As described in detail below, the integrity protection generator 320 may generate or derive integrity protection information associated with management and control traffic of the communication node 300. The integrity protection generator 320 may generate a pairwise integrity key (PIK) to secure management and control traffic. In particular, the integrity protector generator 320 may be a local protocol component to coordinate authentication and key management with a remote entity. In one example, the integrity protection generator 320 may be a supplicant located at a station (e.g., a wireless device). In another example, the integrity protection generator 320 may be an authenticator located at an access point or a mesh point. Based on the PIK, the encryptor 330 may encrypt management data and/or control data.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the integrity protection generator 320 and the encryptor 330 are depicted as separate blocks, the integrity protection generator 320 and the encryptor 330 may be integrated into a single component. The methods and apparatus described herein are not limited in this regard.

Referring back to FIG. 2, for example, the first communication node 210 may be an access point (AP), and the second communication node 220 may be a station (STA). The AP 210 may advertise or inform the station 220 that the AP 210 may operate in accordance with an integrity protection protocol to secure management and control traffic between the AP 210 and the station 220 (e.g., security characteristic discovery). In particular, the AP 210 may transmit security characteristic information associated with the AP 210 to the station 220 (230).

Figure 4:
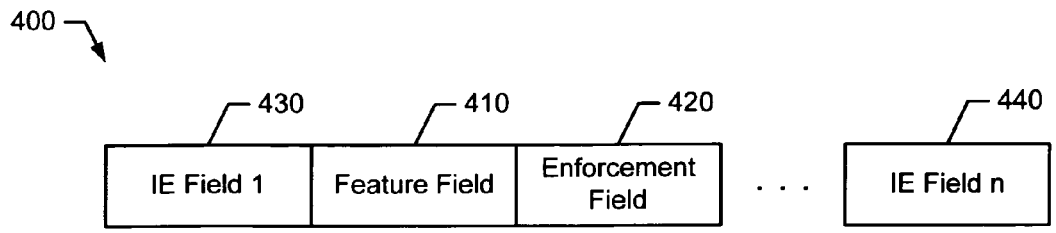
FIG. 4 is a block diagram representation of an example information element of the example integrity protection system of FIG. 2.

In the example of FIG. 4, an information element (IE) 400 may include a feature field 410, an enforcement field 420, and one or more IE fields, generally shown as 430 and 440. Although FIG. 4 depicts two IE fields, the IE 400 may include additional or fewer IE fields. Further, although a particular order of fields is illustrated in FIG. 4, these fields may be arranged in other sequences. The information element 400 may be a data structure used for advertising security capabilities of a communication node such as the AP 210. For example, the information element 400 may be a robust security network information element (RSN-IE) or a management protocol information element (MP-IE).

The feature field 410 may indicate whether the AP 210 operates in accordance with the integrity protection protocol. In one example, a bit value of zero (0) may indicate that the AP 210 is not operating in accordance with the integrity protection protocol (e.g., integrity protection is not enabled) whereas a bit value of one (1) may indicate that the AP 210 is operating in accordance with the integrity protection protocol (e.g., integrity protection is enabled). If integrity protection is not enabled, the station 220 may disregard or ignore feature information of the integrity protection protocol from the AP 210. Otherwise if integrity protection is enabled, the station 220 may read the feature information of the integrity protection protocol from the AP 210 including the enforcement field 420.

The enforcement field 420 may indicate whether integrity protection of management and control traffic is mandatory. In particular, a bit value of zero (0) may indicate that integrity protection is optional whereas a bit value of one (1) may indicate that integrity protection is mandatory. For example, if the feature field 410 is a bit value of zero (0), the station 220 may disregard or ignore the enforcement field 420. Otherwise if the feature field 410 is a bit value of one (1), the station 220 may determine whether integrity protection of management and control traffic is mandatory by determining whether the bit value of the enforcement field 420 is either a one (e.g., integrity protection is mandatory) or a zero (e.g., integrity protection is optional). The methods and apparatus described herein are not limited in this regard.

Turning back to FIG. 2, the AP 210 may communicate the information element 400 to the station 220 via a beacon, a probe reply, and/or an association reply. In one example, the AP 210 may automatically transmit a beacon to the station 220 via a broadcast transmission to indicate that the AP 210 may operate in accordance with the integrity protection protocol. In addition or alternatively, the AP 210 may transmit a probe reply or an association reply to the station 220 in response to receipt of a probe request or an association request, respectively.

Figure 5:
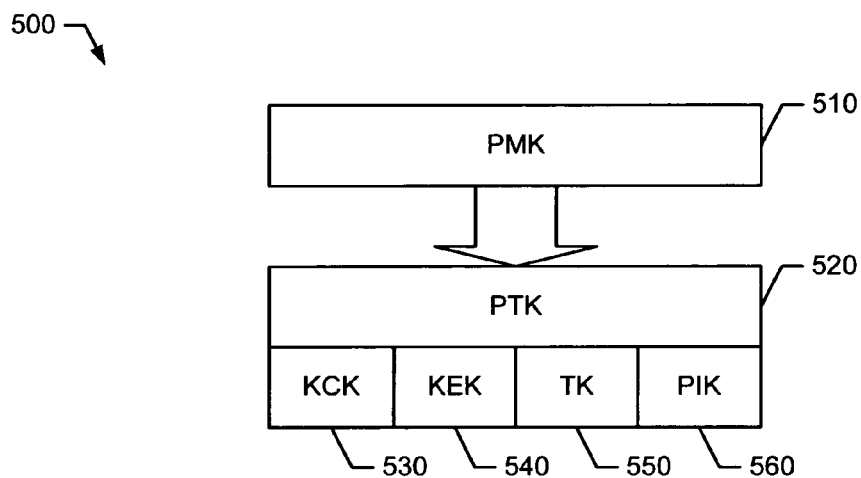
FIG. 5 is a block diagram representation of an example integrity protection key hierarchy of the example integrity protection system of FIG. 2.

The AP 210 and the station 220 may communicate with each other (e.g., four-way handshake) to generate integrity protection keys (e.g., security negotiation and authentication) (240). In the example of FIG. 5, an integrity protection key hierarchy 500 in accordance with a wireless communication protocol as described in, for example, the IEEE std. 802.11i (published 2003) or the IEEE Task Group 802.11r proposal, may include with a pairwise master key (PMK) 510 (e.g., a large random number). In particular, the PMK 510 may be an authorization token to enforce access control decisions.

Based on the PMK 510 and a pseudo-random function (PRF), a pairwise transient key (PTK) 520 may be generated for a session to begin data encryption. The PTK 520 may include a key confirmation key (KCK) 530, a key encryption key (KEK) 540, and a temporary key (TK) 550. The KCK 530 may be a session authentication key used to protect and secure negotiation between the AP 210 and the station 220. The KEK 540 may a session key used for encrypting keys. The TK 550 may be a session encryption key. The methods and apparatus described herein are not limited in this regard.

To provide integrity protection for management and control traffic between the AP 210 and the station 220, the PTK 520 may also include a pairwise integrity key (PIK) 560. As described in detail below and in connection with FIG. 6, the PIK 560 may be used to protect the management and control traffic between the AP 210 and the station 220 (e.g., key management and data protection) (250). For example, the PIK 560 may be used in accordance with security protocols such as counter mode with cipher block chaining (CBC)-message authentication code (MAC) protocol (CCMP), temporary key integrity protocol (TKIP), or advanced encryption standard protocol with one key CBC MAC (OMAC) mode of operation.

Figure 6:
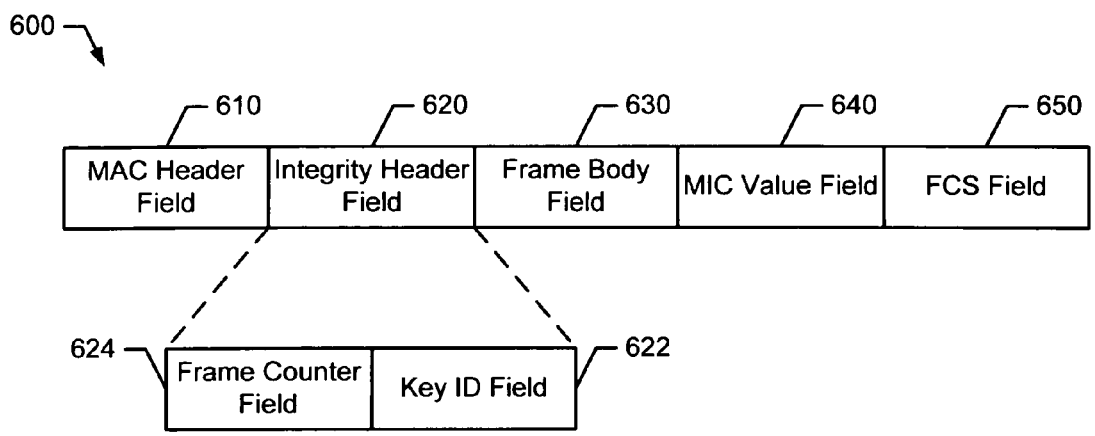
FIG. 6 is a block diagram representation of an example management frame of the example integrity protection system of FIG. 2.

Turning to FIG. 6, an example management frame 600 may include a media access control (MAC) header field 610, an integrity header field 620, a frame body field 630, a message integrity code (MIC) value field 640, and a frame check sequence (FCS) field 650. For example, the management frame 600 may be a MAC management protocol data unit (MMPDU). Although a particular order of fields is illustrated in FIG. 6, these fields may be arranged in other sequences.

The MAC header field 610 may include a frame control field, a destination address field, a station address field, a basic service set ID (BSSID) field, and a sequence control field. In particular, the sequence control field may include a fragment number and a sequence number to determine whether the management frame 600 is a fragmented MMPDU. The AP 210 may determine whether MMPDU is fragmented because the integrity header field 620 and the MIC value field 640 may increase the size of the MMPDU.

The integrity header field 620 may include a frame counter 622 and a key ID field 624. The frame counter field 622 may be used for replay protection. For example, the station 210 detects a replay of the management frame 600, the station 210 may ignore or discard the management frame 600. The station 210 may also log the occurrence of the replay. The frame counter may be initialized to zero or a randomly generated value using a hardware randomizer, a software pseudo-random number generator, and/or a PRF. The frame counter may be incremented after each use of the management frame 600. Also, the frame counter may be reinitialized each time a PIK is generated.

The key ID field 624 may uniquely identify the PIK 520. In one example, the key ID of the PIK 520 may be assigned a unique name: PIK ID=SHA1 (PMK ID∥AA∥SPA ANonce∥SNonce). The PMK ID field may be the name of the PMK 510. The AA field may be a BSSID of the AP 210. The SPA field may be 802.11 MAC address of the station 220. The ANonce and SNonce fields may be session specific information used to derive the PIK 520 (e.g., large random number inputs).

The MIC value field 640 may include the MIC. In particular, the MIC may indicate that the contents of the management frame 600 are integrity protected by a PIK negotiated between the AP 210 and the station 220. The MIC may be calculated based on the PIK 560 and a number of sub-fields of the MAC header field 610. The methods and apparatus described herein are not limited in this regard.

Figure 7:
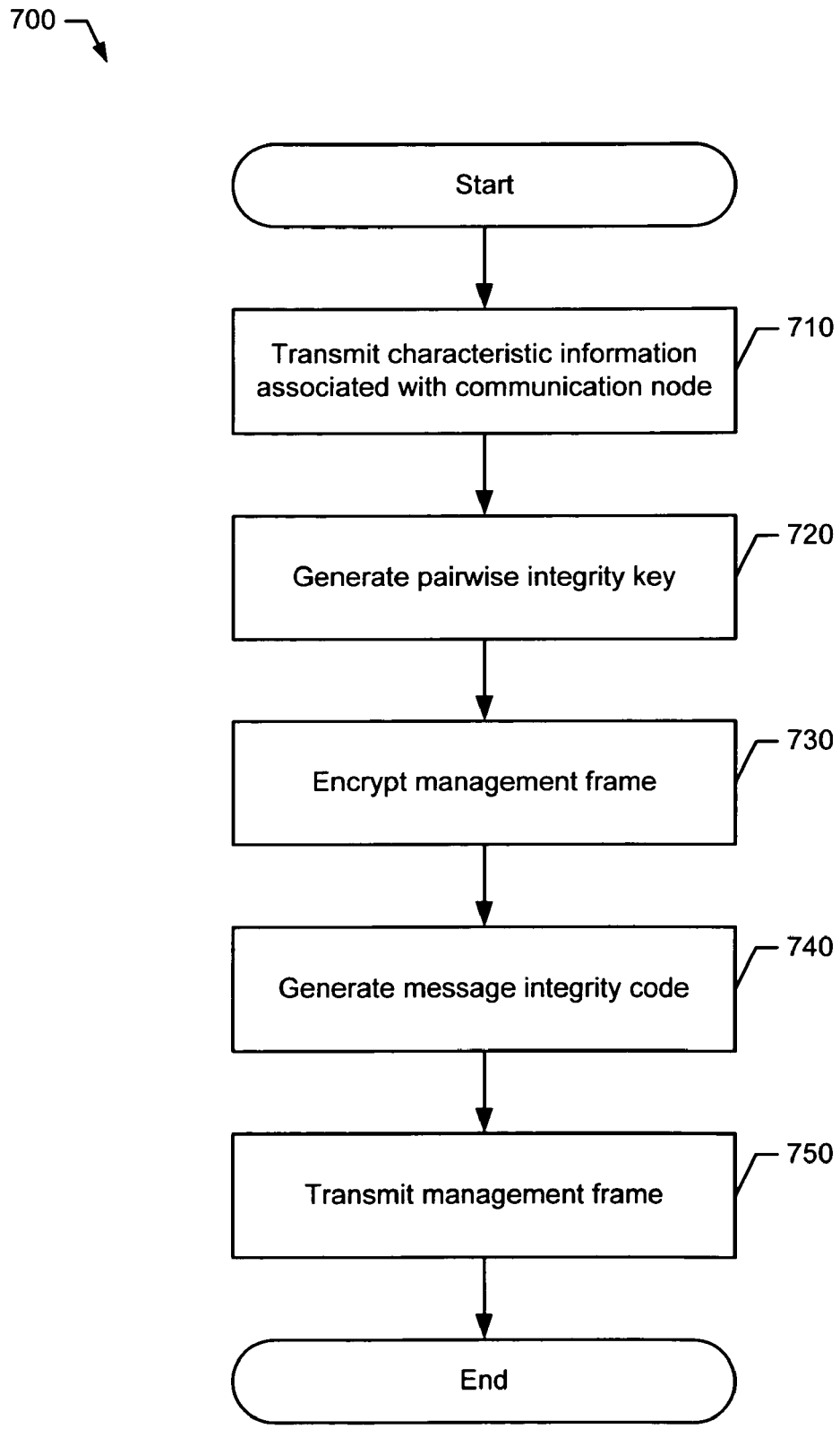
FIG. 7 is a flow diagram representation of one manner in which the example integrity protection system of FIG. 2 may be configured to provide integrity protection for management and control traffic of wireless communication networks.

In particular, FIG. 7 depicts one manner in which the example communication node of FIG. 3 may be configured to provide integrity protection for management and control traffic. The example process 700 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 7, these actions can be performed in other temporal sequences. Again, the example process 700 is merely provided and described in conjunction with the apparatus of FIGS. 1, 2, and 3 as an example of one way to configure a communication node to provide integrity protection for management and control traffic of wireless communication networks.

In the example of FIG. 7, the process 700 may begin with the communication node 300 (e.g., via the communication interface 310) advertising the integrity protection capabilities of the communication node 300 by transmitting security characteristic information associated with the communication node 300 to other communication nodes (block 710). In one example, the AP 210 (FIG. 2) may automatically transmit a beacon including the IE 400 to other communication nodes such as the station 220. In addition or alternatively, the AP 210 may transmit a reply including the IE 400 (e.g., a probe reply or an association reply) in response to a request (e.g., a probe request or an association request, respectively) from the station 220 and/or other communication nodes.

The communication node 300 (e.g., via the integrity protection generator 320) may generate a PIK (block 720). For example, the AP 210 (e.g., via an authenticator) may generate the PIK 520 based on the PMK 510 negotiated between the AP 210 and the station 220. Based on the PIK, the communication node 300 (e.g., via the integrity protection generator 320) may generate a MIC (block 730). In particular, the MIC may indicate that the integrity of the management frame 600 is protected by the PIK 520.

The communication node 300 (e.g., via the encryptor 330) may encrypt a management message and/or a control message with the PIK (block 740). For example, the AP 210 may encrypt the management frame 600 with the PIK and calculate the MIC to protect the integrity of the MAC header field 610, the integrity header field 620, the frame body field 630, and/or other suitable fields of the management frame 600. Accordingly, the communication node 300 (e.g., via the communication interface 310) may protect management and/or control traffic of the communication node 300 (block 750). In one example, the AP 210 may transmit the management frame 600 to the station 210. The methods and apparatus described herein are not limited in this regard.

Although the above examples are described with respect to an AP and a station, the methods and apparatus described herein may be implemented to provide integrity protection for management and control traffic between other communication nodes. In one example, the methods and apparatus described herein may be implemented to provide integrity protection for management and control traffic between two or more APs or stations. In another example, the methods and apparatus described herein may be implemented to provide integrity protection for management control traffic between an AP and an authentication server (not shown).

Figure 8:
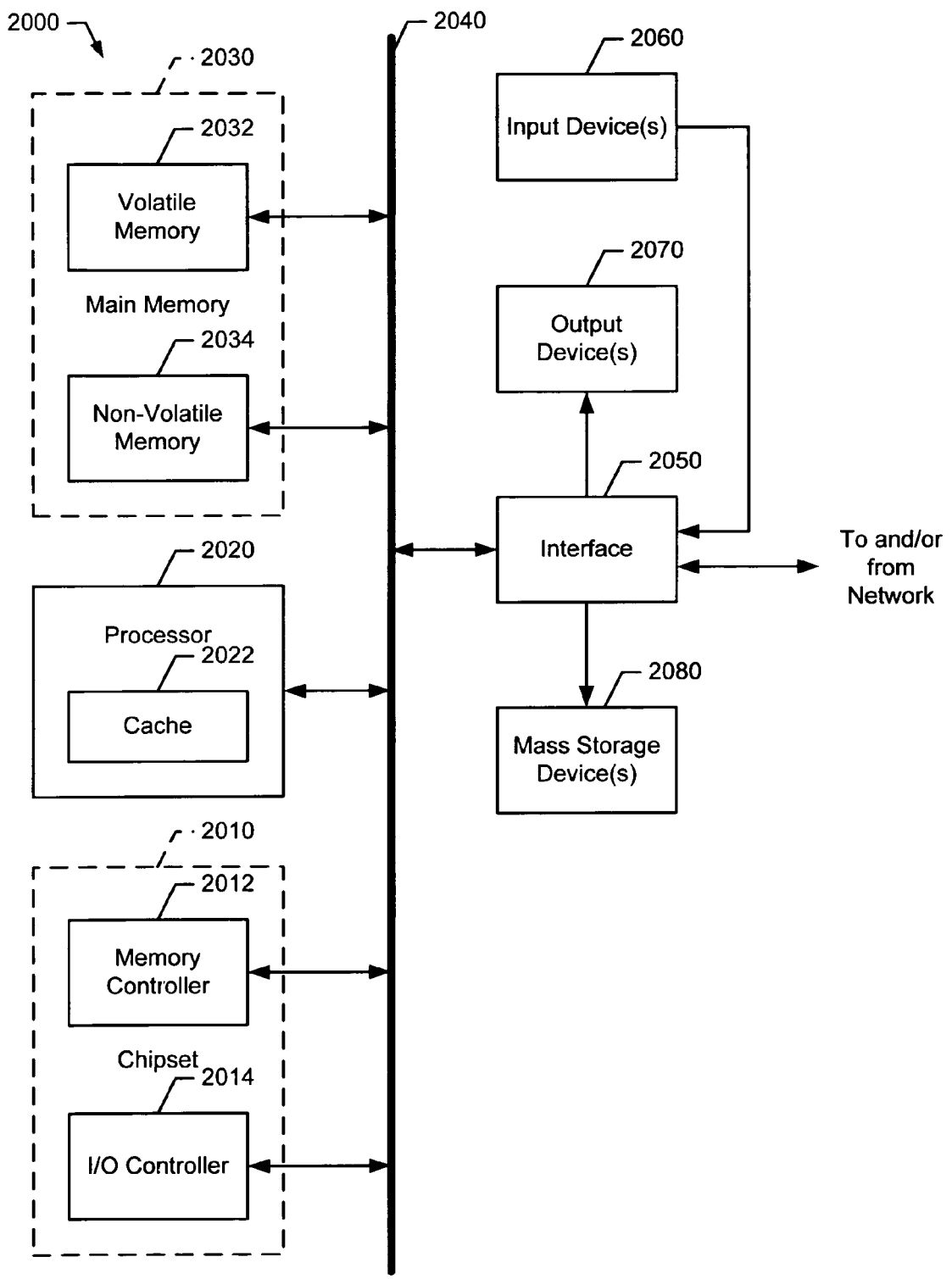
FIG. 8 is a block diagram representation of an example processor system that may be used to implement the example integrity protection system of FIG. 2.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   transmitting, by a communication node, an information element (IE), the IE including a feature field indicating whether the communication node operates in accordance with an integrity protection protocol specifically for management frames, and the IE further including an enforcement field that advertises whether the integrity protection protocol for management and control frames is mandatory; and
   generating, by the communication node, a pairwise transient key (PTK), the PTK including a first plurality of keys and a pairwise integrity key (PIK), wherein the first plurality of keys are configured to protect an integrity of data frames transmitted by the communication node and the PIK is configured to protect an integrity of management frames transmitted by the communication node, wherein management frames are dedicated to management traffic and wherein the first plurality of keys and the PIK are different keys.

2. The method of claim 1, further comprising generating, by the communication node, a management frame including one or more fields that are derived from the PIK to protect the integrity of the management frame, wherein the management frame further includes a frame counter field to detect a replay of the management frame, wherein the frame counter field is incremented by the communication node after generation of individual management frames, and wherein the frame counter field is reinitialized each time a PIK is generated.

3. The method of claim 2, further comprising transmitting, by the communication node, the generated management frame.

4. The method of claim 1, wherein transmitting the IE comprises transmitting the IE via one of a beacon, a probe reply, or an association reply.

5. The method of claim 1, wherein transmitting the IE comprises one of automatically transmitting the IE via a broadcast transmission or transmitting the IE via unicast transmission in response to receipt of one of a probe request or an association request.

6. The method of claim 1, wherein the IE comprises one of a robust security network information element or a management protocol information element.

7. The method of claim 1, wherein said communication node comprises one of an access point, a station, a mesh point, or a network server.

8. The method of claim 1, wherein said generating the PTK comprises generating the PTK based on a pairwise master key.

9. The method of claim 1, further comprising generating a message integrity code based on the generated PIK.

10. The method of claim 1, wherein said generating the management frame further comprises generating the management frame including at least one of an integrity header or a message integrity code, and wherein the integrity header comprises at least one of a frame counter or a key identifier.

11. The method of claim 1, wherein said generating the management frame further comprises generating the management frame including a media access control (MAC) management protocol data unit.

12. An apparatus comprising:
   a communication interface to transmit an information element (IE) associated with a communication node, the IE including a feature field indicating an operability of the communication node in accordance with an integrity protection protocol for management data traffic, and the IE further including an enforcement field that advertises whether the integrity protection protocol for management frames is mandatory; and
   an integrity protection generator coupled to the communication interface to generate a pairwise transient key (PTK), the PTK including a first plurality of keys and a pairwise integrity key (PIK), wherein the first plurality of keys are configured to protect an integrity of data frames transmitted by the communication node and the PIK is configured to protect an integrity-associated with one of management traffic of the communication node, wherein management frames are dedicated to management traffic and control traffic, respectively, and wherein data frames includes data or payload information.

13. The apparatus of claim 12, wherein the communication interface is further configured to transmit a management frame including one or more fields that are derived from the PIK and are configured to protect the integrity of the management frame, wherein the management or control frame further includes a frame counter field to detect a replay of the management frame, wherein the frame counter field is incremented by the communication node after generation of individual management frames, and wherein the frame counter field is reinitialized each time a PIK is generated.

14. The apparatus of claim 12, wherein the communication interface is configured to transmit the IE via one of a beacon, a probe reply, or an association reply.

15. The apparatus of claim 12, wherein the IE comprises one of a robust security network information element or a management protocol information element.

16. The apparatus of claim 12, wherein the communication interface is configured to transmit the IE associated with one of an access point, a station, a mesh point, or a network server.

17. The apparatus of claim 12, wherein the communication interface is configured to transmit the management frame including at least one of an integrity header or a message integrity code, and wherein the integrity header comprises at least one of a frame counter or a key identifier.

18. The apparatus of claim 12, wherein the integrity protection generator is configured to generate the PTK based on a pairwise master key.

19. The apparatus of claim 12, wherein the integrity protection generator comprises one of a supplicant or an authenticator.

* * * * *